(12) United States Patent
Choi et al.

(10) Patent No.: US 10,111,270 B2
(45) Date of Patent: Oct. 23, 2018

(54) METHOD AND APPARATUS FOR RECEIVING SIGNAL BY USING RESOURCE UNITS IN A WIRELESS LOCAL AREA SYSTEM

(71) Applicant: LG ELECTRONICS INC., Seoul (KR)

(72) Inventors: Jinsoo Choi, Seoul (KR); Dongguk Lim, Seoul (KR); Hangyu Cho, Seoul (KR); Wookbong Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 194 days.

(21) Appl. No.: 15/165,969

(22) Filed: May 26, 2016

(65) Prior Publication Data

US 2016/0353414 A1 Dec. 1, 2016

Related U.S. Application Data

(60) Provisional application No. 62/166,642, filed on May 26, 2015.

(51) Int. Cl.

| | |
|---|---|
| *H04W 76/14* | (2018.01) |
| *H04W 4/00* | (2018.01) |
| *H04W 72/04* | (2009.01) |
| *H04W 76/02* | (2009.01) |
| *H04W 4/70* | (2018.01) |
| *H04L 5/00* | (2006.01) |
| *H04W 84/12* | (2009.01) |

(52) U.S. Cl.
CPC .......... *H04W 76/14* (2018.02); *H04L 5/00* (2013.01); *H04W 4/005* (2013.01); *H04W 4/70* (2018.02); *H04W 72/042* (2013.01); *H04W 76/023* (2013.01); *H04W 84/12* (2013.01)

(58) Field of Classification Search
CPC ........ H04W 76/023; H04W 76/14; H04L 5/00
See application file for complete search history.

(56) References Cited

U.S. PATENT DOCUMENTS

| 2016/0021568 A1* | 1/2016 | Yu ......................... H04L 5/0048 |
| | | 370/329 |
| 2016/0165574 A1* | 6/2016 | Chu ....................... H04L 5/0007 |
| | | 370/312 |
| 2016/0227533 A1* | 8/2016 | Josiam ................ H04W 74/006 |
| 2016/0316458 A1* | 10/2016 | Kwon ................. H04L 27/2601 |
| 2016/0330757 A1* | 11/2016 | Cherian ............ H04W 72/1268 |

(Continued)

*Primary Examiner* — Hassan Kizou
*Assistant Examiner* — Deepa Belur
(74) *Attorney, Agent, or Firm* — Lee Hong Degerman Kang Waimey

(57) ABSTRACT

Provided is a method for receiving an uplink PPDU by using a plurality of RUs through a specific band in a wireless LAN system in which a plurality of bands is supported. Transmission of the uplink PPDU is disclosed by a trigger frame and the trigger frame indicates information on an identifier and a frequency resource of each station. In the trigger frame, an index field indicating the RU may be configured with the same size regardless of a bandwidth. To this end, a plurality of index groups is used instead of a method indicating a bitmap field or a start point/offset. A first index group of the index field may be used to indicate a first RU and a second index group of the index field may be used to indicate a second RU.

8 Claims, 14 Drawing Sheets

(56) References Cited

U.S. PATENT DOCUMENTS

| | | | |
|---|---|---|---|
| 2017/0026151 A1* | 1/2017 | Adachi | H04W 72/005 |
| 2017/0033898 A1* | 2/2017 | Chun | H04W 84/12 |
| 2017/0048890 A1* | 2/2017 | Sun | H04W 74/08 |
| 2018/0115451 A1* | 4/2018 | Choi | H04L 27/2633 |

* cited by examiner

FIG. 11

METHOD AND APPARATUS FOR RECEIVING SIGNAL BY USING RESOURCE UNITS IN A WIRELESS LOCAL AREA SYSTEM

CROSS-REFERENCE TO RELATED APPLICATIONS

Pursuant to 35 U.S.C. § 119(e), this application claims the benefit of U.S. Provisional application 62/166,642, filed on May 26, 2015, the contents of which are hereby incorporated by reference herein in its entirety.

BACKGROUND OF THE INVENTION

Field of the Invention

The present description relates to a technique that transmits/receives data in wireless communication, and more particularly, to a method and an apparatus for requesting uplink data in a wireless LAN system and transmitting uplink data in response to the request.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

The present description provides a technique that configures a frame which requests uplink data.

The present description also provides a technique in which a frame efficiently signals RUs allocated to multiple STAs, respectively.

In an aspect, provided is a method for receiving a signal by using at least any one of a plurality of RUs including a first resource unit (RU) and a second RU through at least any one of a plurality of bands in a wireless LAN system.

In detail, the corresponding method may include: transmitting, by an access point (AP), a downlink physical protocol data unit (PPDU) including a trigger frame allocating a resource for uplink multiple user (MU) transmission to a plurality of receiving stations, the trigger frame including a plurality of resource unit allocation fields for the plurality of receiving stations and each of the plurality of respective resource unit allocation fields includes an index field indicating a resource unit allocated for a corresponding receiving station.

Further, the method may include receiving a plurality of uplink PPDUs from the plurality of receiving stations through radio resources indicated by the plurality of resource unit allocation fields in response to the downlink PPDU.

In addition, a bit length of the index field may be identically configured with respect to the plurality of bands.

Moreover, a first index group of the index field may be used to indicate the first RU and a second index group of the index field may be used to indicate the second RU.

Besides, each of the first index group and the second index group may include continuous index values and the second index group may be configured to be continuous to the first index group.

The aforementioned method may be applied to an AP or a non-AP apparatus including an RF and a processor.

An example according to the present description provides a technique that configures a frame which requests uplink data.

Another example according to the present description provides a technique which efficiently indicates RUs through an index bit having a fixed size in a wireless LAN system in which multiple RUs and multiple bandwidths are supported.

Yet another example of the present description provides a technique which efficiently indicates the multiple RUs without using a related technique such as a bitmap or a start point/offset.

BRIEF DESCRIPTION OF THE DRAWINGS

FIG. 11 is a diagram illustrating an example of a technique which configures an RU allocation field according to an embodiment of the present invention.

DESCRIPTION OF EXEMPLARY EMBODIMENTS

Figure 1:
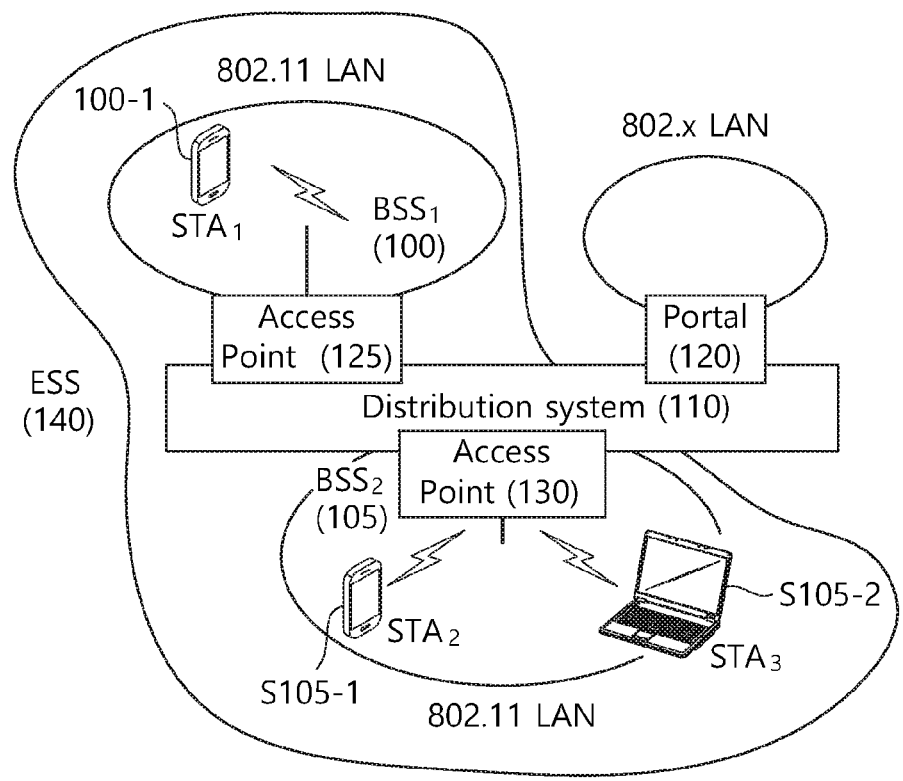
FIG. 1 is a conceptual view illustrating the structure of a wireless local area network (WLAN).
Figure 1:
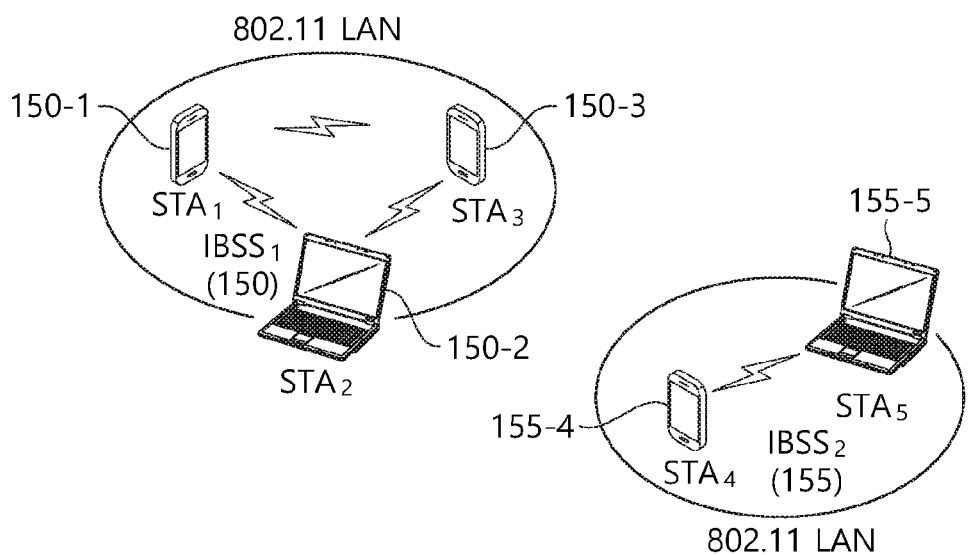

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
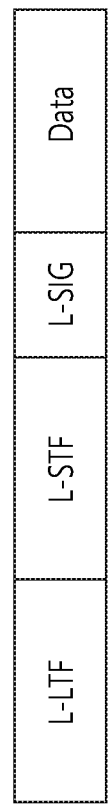
FIG. 2 is a diagram illustrating an example of a PPDU used in an IEEE standard.
Figure 2:
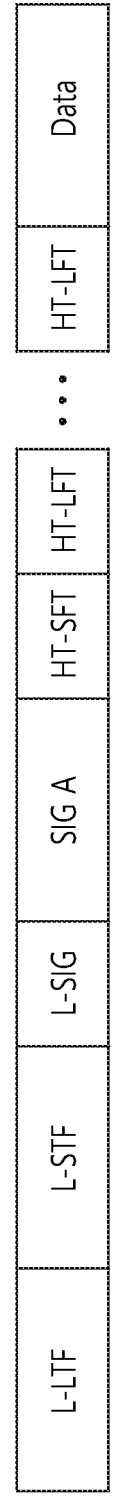
Figure 2:

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-ISG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
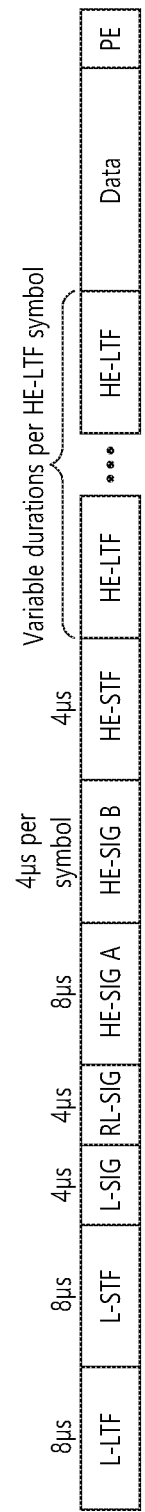
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
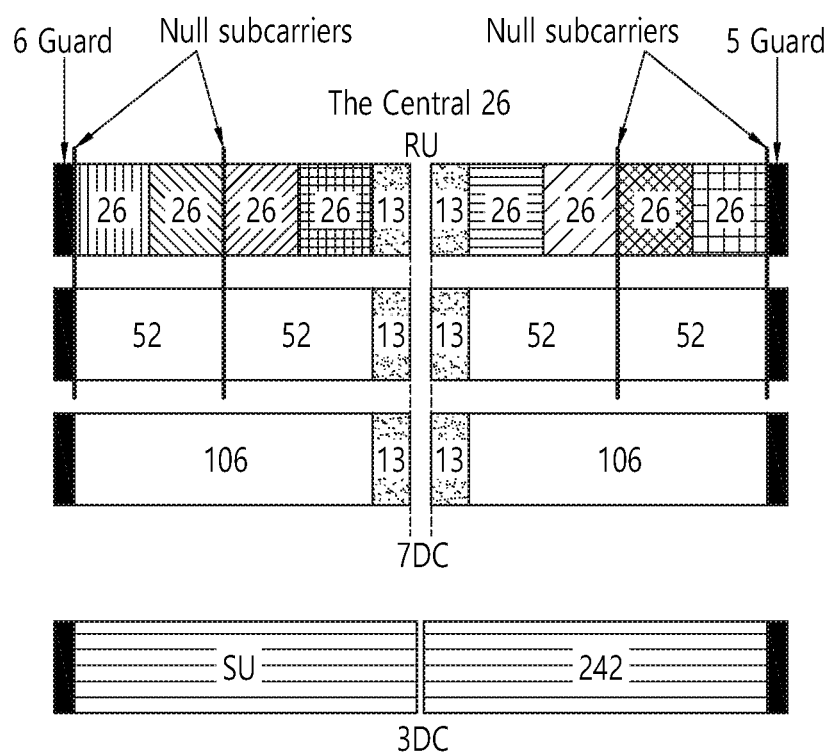
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
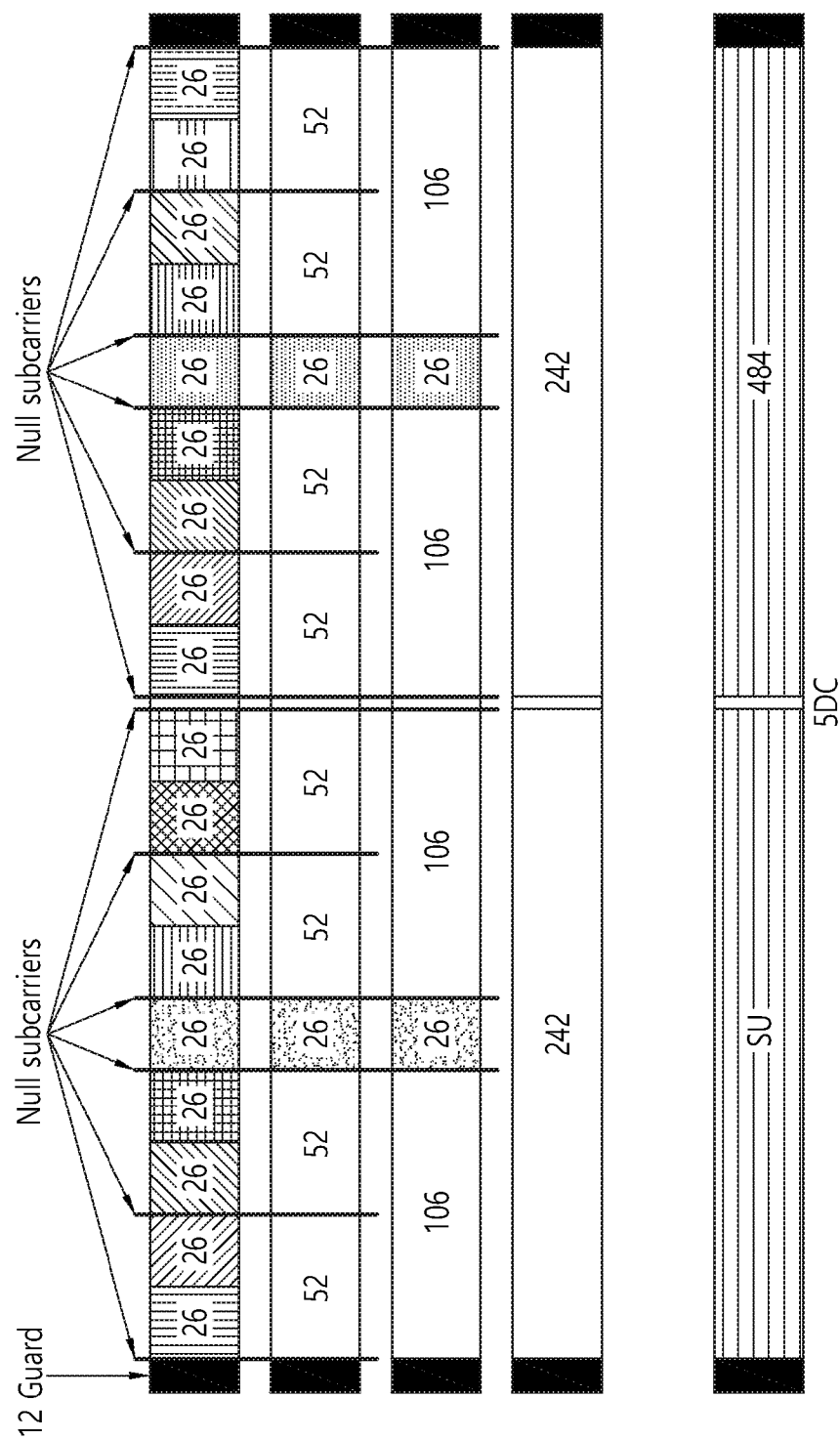
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
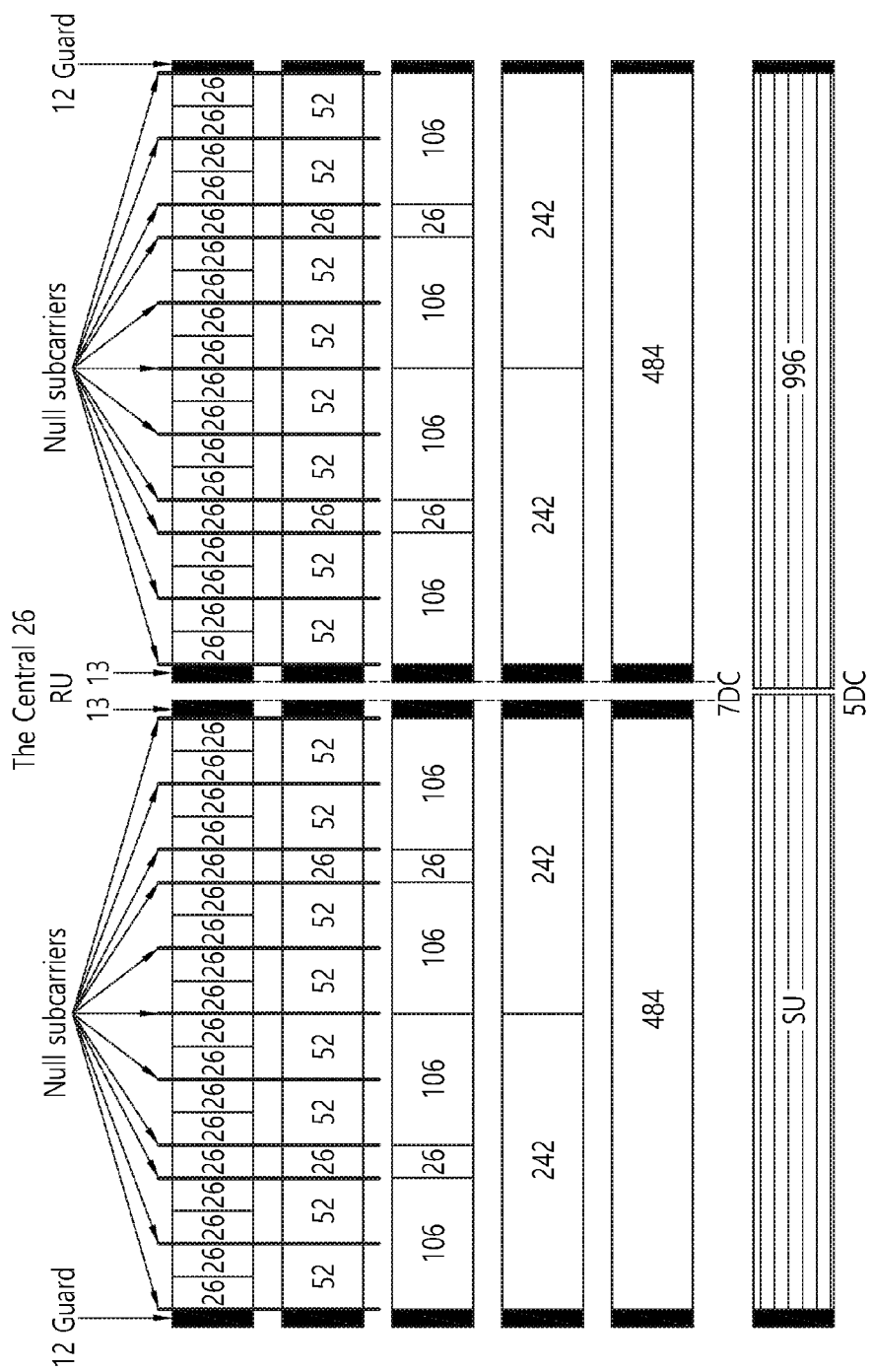
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted.

Meanwhile, the detailed number of RUs may be modified similarly to one example of each of FIG. 4 or 5.

Figure 7:
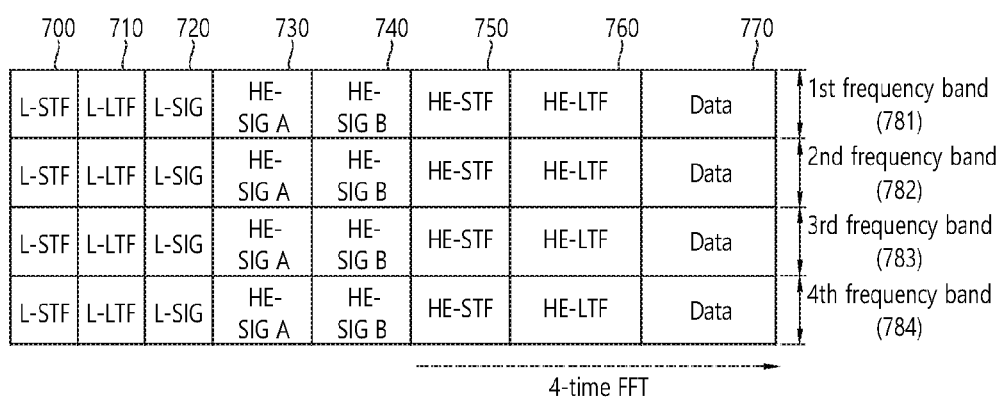
FIG. 7 is a diagram illustrating another example of the HE PDDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
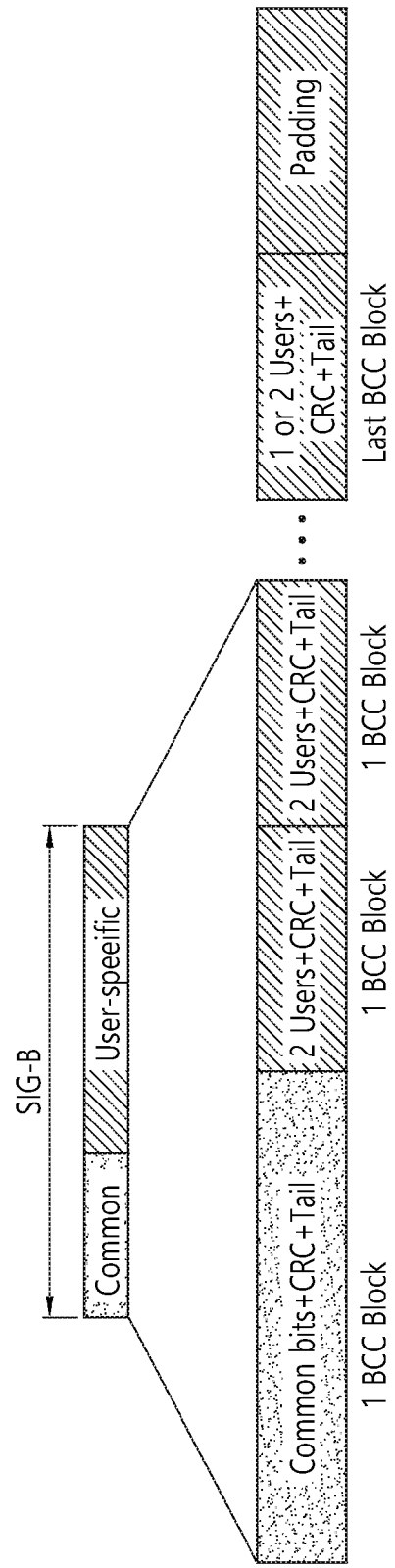
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For easy description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as anther term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Further, as described above, the different frequency resources may be different subbands (alternatively, sub channels) or different resources units (RUs).

The different frequency resources are indicated through a trigger frame with respect to the plurality of respective STAs.

Figure 9:
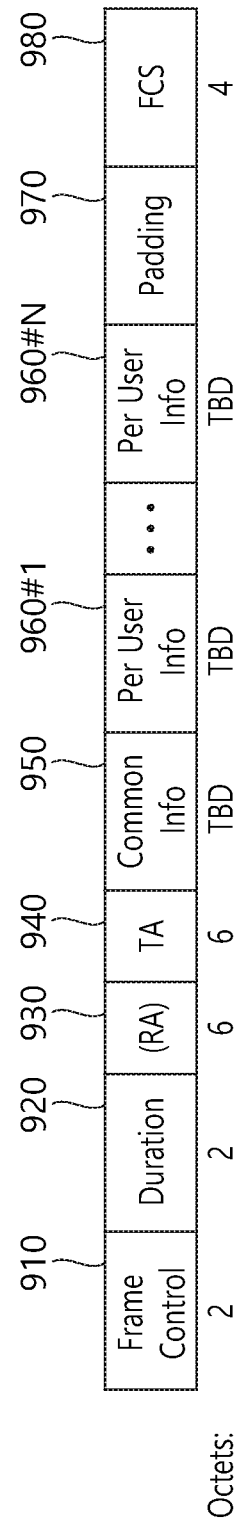
FIG. 9 illustrates one example of a trigger frame.

FIG. 9 illustrates an example of a trigger frame. The trigger frame of FIG. 9 may allocate a resource for uplink multiple-user (MU) transmission and may be transmitted from the AP. The trigger frame may be constituted by an MAC frame and included in the PPDU. For example, the trigger frame may transmitted through the PPDU illustrated in FIG. 3, transmitted through the legacy PPDU illustrated in FIG. 2, or transmitted through a PPDU which is particularly designed for the corresponding trigger frame. When the trigger frame is transmitted through the PPDU illustrated in FIG. 3, the trigger frame may be included in the illustrated data field.

Some respective fields illustrated in FIG. 9 may be omitted and other fields may be added. Further, each field length may vary unlike those illustrated in FIG. 9.

A frame control field 910 of FIG. 9 includes information on a MAC protocol version and other additional control information, and a duration field 920 may include time information for NAV setting or information on an identifier (for example, AID) of the UE.

Further, an RA field 930 includes address information of a receiving STA of the corresponding trigger frame and may be omitted if necessary. A TA field 940 includes address information of an STA (for example, AP) transmitting the corresponding trigger frame and a common information field 950 includes common control information which is applied to the receiving STA receiving the corresponding trigger frame. For example, a field indicating a length of an L-SIG field of the uplink PPDU transmitted in response to the corresponding trigger frame or another field controlling contents of a SIG-A field (that is, HE-SIG-A field) of the uplink PPDU transmitted in response to the corresponding trigger frame may be included. Further, as the common control information, information on a length of the CP of the uplink PPDU transmitted in response to the corresponding trigger frame or information on a length of the LTF field may be included.

Further, per user information fields 960#1 to 960#N corresponding to the number of the receiving STAs receiving the trigger frame of FIG. 9 may be included. The per user information field may be called a "RU allocation field".

Further, the trigger frame of FIG. 9 may include a padding field 970 and a frame check sequence field 980.

Each of the per user information fields 960#1 to 960#N illustrated in FIG. 9 may include a plurality of subfields again.

Figure 10:
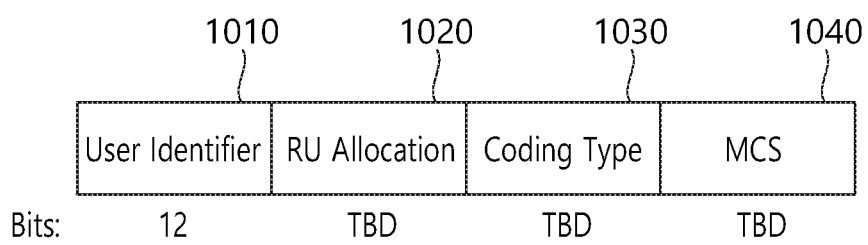
FIG. 10 illustrates one example of a subfield included in a per user information field.

FIG. 10 illustrates an example of a subfield included in the per user information field. Some of the subfields of FIG. 10 may be omitted and other subfields may be added. Further, a length of each illustrated subfield may be modified.

A user identifier field 1010 of FIG. 10 represents an identifier of the STA (that is, the receiving STA) corresponding to the per user information and an example of the identifier may be all or some of AIDs.

Further, a RU allocation field 1020 may be included. That is, when the receiving STA identified as the user identifier field 1010 transmits the uplink PPDU in response to the trigger frame of FIG. 9, the receiving STA transmits the corresponding trigger frame through the RU indicated by the RU allocation field 1020. In this case, the RU indicated by the RU allocation field 1020 may indicate the RUs illustrated in FIGS. 4, 5, and 6. A detailed configuration of the RU allocation field 1020 will be described below.

The subfield of FIG. 10 may include a coding type field 1030. The coding type field 1030 may indicate a coding type of the uplink PPDU transmitted in response to the trigger frame of FIG. 9. For example, when the BCC coding is applied to the uplink PPDU, the coding type field 1030 is set to '1' and when the LDPC coding is applied to the uplink PPDU, the coding type field 1030 may be set to '0'.

Further, the subfield of FIG. 10 may include a MCS field 1040. The MCS field 1040 may indicate a MCS method applied to the uplink PPDU transmitted in response to the trigger frame of FIG. 9. For example, when the BCC coding is applied to the uplink PPDU, the coding type field 1030 is set to '1' and when the LDPC coding is applied to the uplink PPDU, the coding type field 1030 may be set to '0'.

Hereinafter, a method of configuring the RU allocation field 1020 will be described.

Generally, a method which may be instinctively considered in the case of configuring the field indicating the RU is a method of indicating a staring point of the RU and an offset from the starting point. However, in the case of indicating the staring point of the RU and the offset, a technical problem in which a plurality of bits are required for accurately indicating the RU occurs.

Another instinctive method is to use a bitmap. However, the technical problem in which the plurality of bits is used for using the bitmap occurs. For example, as illustrated in FIG. 6, in the case of using the bitmap for signaling the RU of a 80 MHz band, there is a problem in that 26-RU requires a minimum of 37 bits for indicating 37 (one central 26-RU and other 36 26-RUs).

Figure 11:
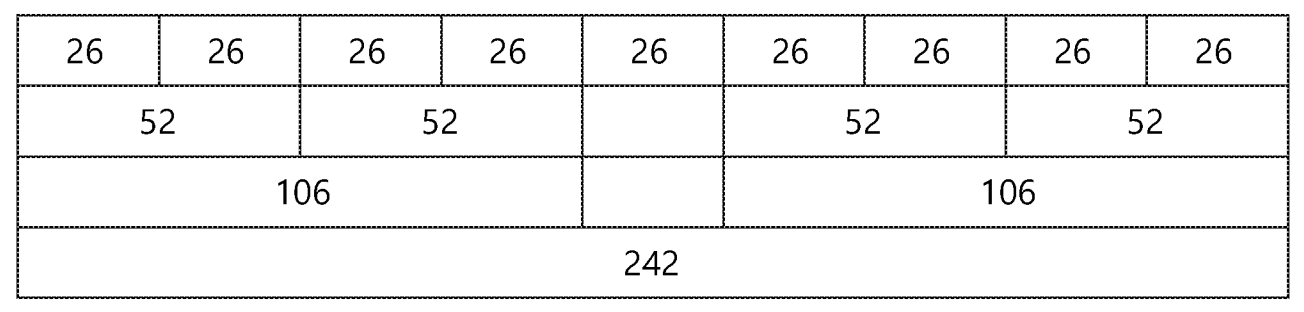

FIG. 11 is a diagram illustrating an example of a technique which configures an RU allocation field according to an embodiment of the present invention.

FIG. 11 more simply illustrates the RU arrangement illustrated in FIG. 4. In this case, it is possible of grant continuous indexes to each RU and it is possible to configure the RU allocation field through a 4-bit index field.

For example, in the case of being expressed in binary, index values '0000' to '1000' may be used for indicating the 26-RU, index values '1001' to '1100' may be used for indicating the 52-RU, '1101' and '1110' may be used for indicating the 106-RU, and '1111' may be used for indicating the 242-RU.

However, when the method of FIG. 11 is applied to 40 MHz, 80 MHz, 160 MHz (including 80+80 MHz), and the like as it is, the size of the RU allocation field needs to vary according to a bandwidth. That is, RU allocation of all bands may not be indicated through the 4-bit index field. If the size of the RU allocation field varies according to the bandwidth, there is a problem in that complexity of the field configuration is increased.

Accordingly, the embodiment provides an index field which is set with the same size (i.e., the same bit length) regardless of the size of the band including 20 MHz, 40 MHz, 80 MHz, 160 MHz, and the like. The index field may be set to 8 bits.

Among them, an example of lower 7 bits may be as follows.

TABLE 1

| 7 bits indices | Message | Number of entries |
|---|---|---|
| 0000000~0100100 | Possible 26 RU cases | 37 |
| 0100101~0110100 | Possible 52 RU cases | 16 |
| 0110101~0111100 | Possible 106 RU cases | 8 |
| 0111101~1000000 | Possible 242 RU cases | 4 |

TABLE 1-continued

| 7 bits indices | Message | Number of entries |
|---|---|---|
| 1000001~1000010 | Possible 484 RU cases | 2 |
| 1000011 | 996 RU cases | 1 |
| 1000100 | 160 MHz/80 + 80 MHz case | 1 |
| Total | | 69 |

As described above, the 7 bit information may be applied to all of the plurality of bands (that is, 20 MHz, 40 MHz, 80 MHz, and the like). That is, the size of the index field may be set equally to the plurality of bands.

Further, as illustrated in Table 1, the index field may be divided into multiple index groups. That is, a first index group (0000000-0100100) is used for indicating a first RU (that is, 26-RU) and a second index group (0100101-0110100) is used for indicating a second RU (that is, 52-RU). Each index group may be set to be continuous. That is, a third index group (0110101-0111100) may be used for a third RU (that is, 106-RU), a fourth index group (0111101-1000000) may be used for a fourth RU (that is, 242-RU), and a fifth index group (1000001-1000010) may be used for a fifth RU (that is, 484-RU). The size of the particular RU may be modified.

Meanwhile, the index value "1000011" is used for 996-RU and the index value "1000100" may be used for indicating two 996-RUs included in 160 MHz (including 80+80 MHz).

In this case, the index group may be constant regardless of the bandwidth.

That is, even though 20 MHz is used, the first index group may be set to a range of the index values '0000000 to 0100100'. In this case, 9 26-RUs are present on 20 MHz, and 9 26-RUs may be indicated by using some periods/domains (that is, '0000000' to '0001000') in the first index group. Meanwhile, the 52-RU on 20 MHz may be indicated through the lowest domain (that is, '0100101-0101000') in the second index group (0100101-0110100). The aforementioned rule is applied equally even to 40 MHz and the like. That is, each index group is constantly set regardless of the bandwidth and may indicate the corresponding RU by using low domains of each index group.

The 7 bit information may use 1 bit information which is additionally included. The additional 1 bit information may indicate whether the 7 bit information relates to a lower 80 MHz band or a higher 80 MHz band when 160 MHz (including 80+80 MHz) becomes a problem. That is, the 1 bit information and the 7 bit information may be included in the RU allocation field 1020 together.

The index field configured like Table 1 is included in the RU allocation field 1020 of FIG. 10. That is, the index field configured like Table 1 may be included in the per user information fields 960#1 to 960#N of FIG. 9. Meanwhile, the trigger frame of FIG. 9 indicates the per user information fields 960#1 to 960#N with respect to the RU used for the uplink PPDU, but there is no need to make an explicit indication for a time period when the uplink PPDU is transmitted. That is, hereinafter, like FIG. 12, after the trigger frame is transmitted, when a predetermined time elapses (for example, SIFS), the uplink PPDU is transmitted and thus, there is no need to include information on a separate time period.

Figure 12:
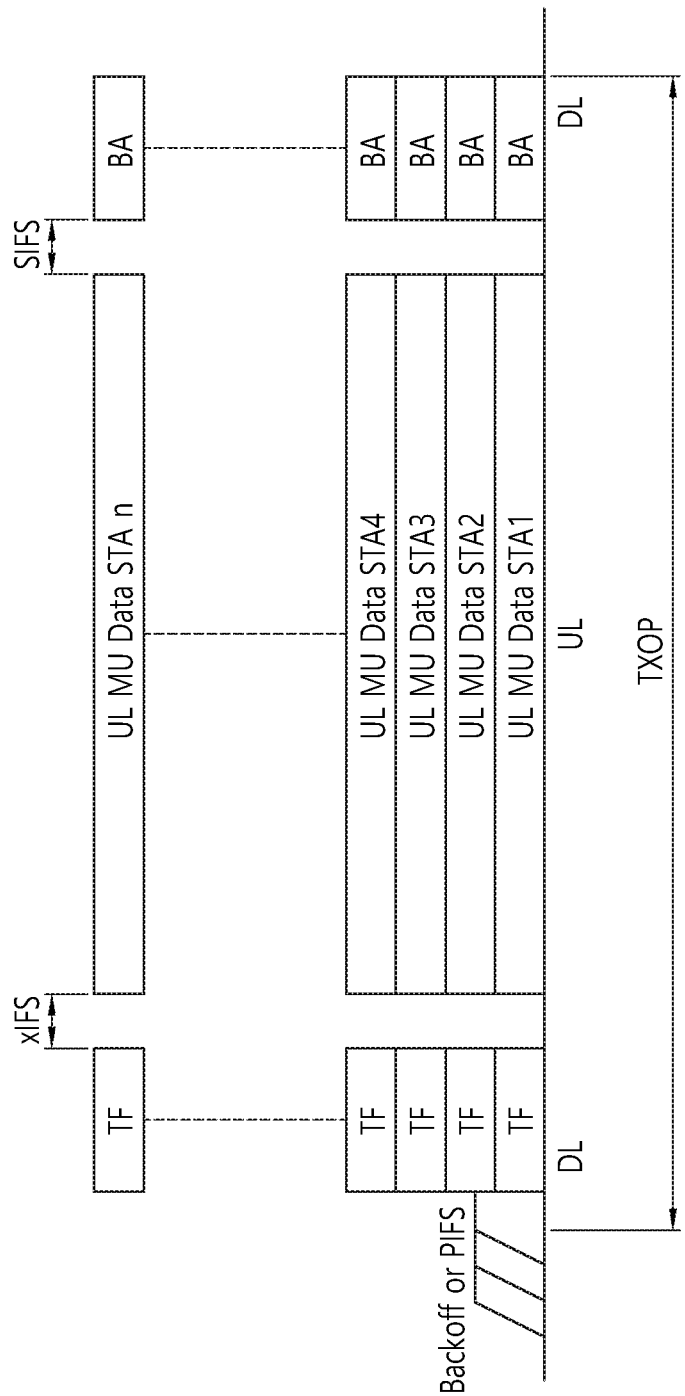
FIG. 12 is a diagram describing an operation according to a trigger frame.

FIG. 12 is a diagram describing an operation according to a trigger frame.

As illustrated in FIG. 12, the AP may transmit a trigger frame TF to a plurality of receiving STAs (that is, STA 1 to STA n). In this case, the plurality of receiving STAs may transmit the uplink PPDU after the predetermined time. The RU to which the uplink PPDU is transmitted is indicated by the index field illustrated in Table 1. When the transmission of the corresponding uplink PPDU is completed, ACK/NACK information may be transmitted through a block ACK/NACK (BA) frame after the predetermined time (for example, SIFS).

The block ACK/NACK may be transmitted to each STA by a unicast method as illustrated in FIG. 12 and transmitted to all of the STAs in at least one M-BA (multi-STA BA) frame form. Further, the illustrated trigger frame TF is illustrated in a form of n blocks, but may be transmitted in one block form.

Figure 13:
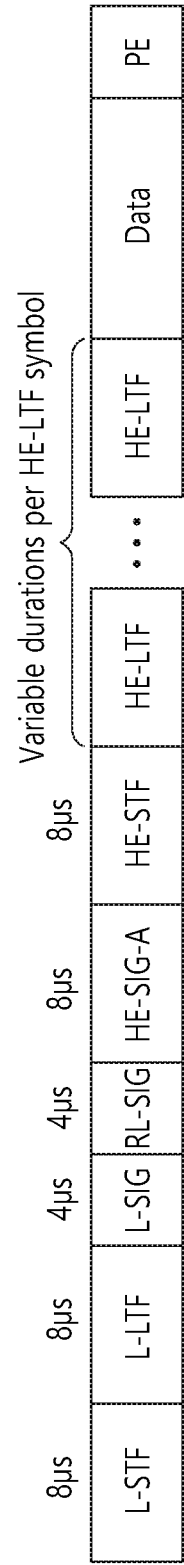
FIG. 13 is a block diagram illustrating an uplink PPDU transmitted in response to the aforementioned trigger frame.

FIG. 13 is a block diagram illustrating an uplink PPDU transmitted in response to the aforementioned trigger frame.

As illustrated in FIG. 13, the PPDU of FIG. 13 includes various fields, and each field corresponds to the field illustrated in FIGS. 2 and 3. Meanwhile, as illustrated in FIG. 13, the uplink PPDU of FIG. 13 may include only a HE-SIG-A field without a HE-SIG-B field.

Figure 14:
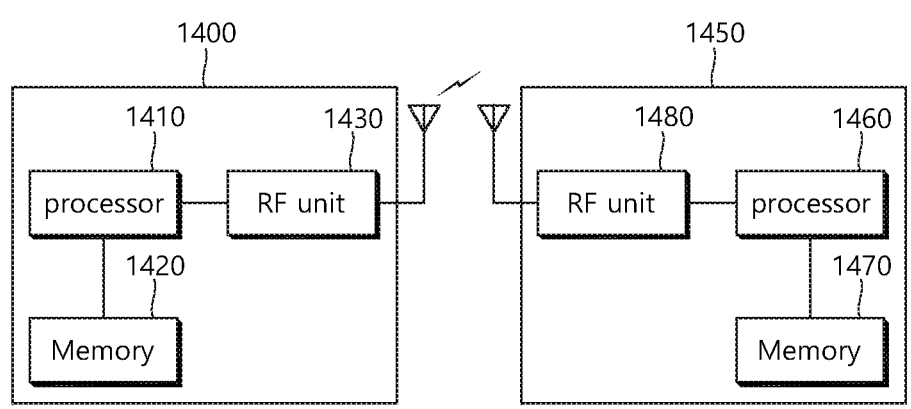
FIG. 14 is a block diagram illustrating a wireless apparatus to which an embodiment of the present description can be applied.

FIG. 14 is a block diagram illustrating a wireless apparatus to which an embodiment can be applied.

Referring to FIG. 14, the wireless apparatus as an STA capable of implementing the aforementioned embodiment may be an AP 1900 or a non-AP station. The wireless apparatus may correspond to the user or a transmitting apparatus which transmits a signal to the user.

The AP 1400 may include a processor 1410, a memory 1420, and a radio frequency (RF) unit 1430.

The RF unit 1430 is connected with the processor 1410 to transmit/receive a radio signal.

The processor 1410 implements a function, a process, and/or a method which are proposed in the present invention. For example, the processor 1410 may perform the operation of according to the embodiment. That is, the processor 1410 may perform the operation which may be performed by the AP among the operations disclosed in the embodiment of FIGS. 1 to 13.

The non-AP STA 1450 may include a processor 1460, a memory 1470, and a radio frequency (RF) unit 1480.

The RF unit 1480 is connected with the processor 1460 to transmit/receive the radio signal.

The processor 1460 may implement a function, a process, and/or a method which are proposed in the present invention. For example, the processor 1460 may be implemented to perform a non-AP STA operation according to the embodiment. The processor may perform the operation of the non-AP STA in the embodiment of FIGS. 1 to 13.

The processors 1410 and 1460 may include an application-specific integrated circuit (ASIC), other chipset, a logic circuit, a data processing device, and/or a converter that converts a baseband signal and the radio signal to each other. The memories 1420 and 1470 may include a read-only memory (ROM), a random access memory (RAM), a flash memory, a memory card, a storage medium, and/or other storage devices. The RF units 1430 and 1480 may include one or more antennas that transmit and/or receive the radio signal.

When the embodiment is implemented by software, the aforementioned technique may be implemented by a module (a process, a function, and the like) that performs the aforementioned function. The module may be stored in the memories 1420 and 1470 and executed by the processors 1410 and 1460. The memories 1420 and 1470 may be positioned inside or outside the processors 1410 and 1460 and connected with the processors 1410 and 1460 through various well-known means.

What is claimed is:

1. A method for receiving a signal by using at least one of a plurality of resource units (RUs) including a first resource unit (RU) and a second RU through at least one of a plurality of bands in a wireless LAN system, the method comprising:
transmitting, by an access point (AP), a downlink physical protocol data unit (PPDU) including a trigger frame allocating a resource for uplink multiple user (MU) transmission to a plurality of receiving stations,
wherein the trigger frame is used to trigger transmission of a plurality of uplink PPDUs from the plurality of receiving stations,
wherein the trigger frame includes a plurality of resource unit allocation fields for the plurality of receiving stations,
wherein each resource unit (RU) allocation field includes an index field indicating a RU allocated for a corresponding receiving station, and
wherein the trigger frame includes a common information field indicating control information on a cyclic prefix (CP) and long training fields (LTFs) of the plurality of uplink PPDUs; and
in response to the downlink PPDU, receiving the plurality of uplink PPDUs from the plurality of receiving stations through radio resources indicated by the plurality of resource unit allocation fields,
wherein each uplink PPDU includes a legacy part having a first subcarrier frequency spacing and a high efficient (HE) part having a second subcarrier frequency spacing, the legacy part includes a legacy short training field (L-STF), a legacy long training field (L-LTF), and a legacy signal (L-SIG) field, the HE part includes a HE-STF, a HE-LTF, and a data field, the first subcarrier frequency spacing is set to 312.5 kHz, and the second subcarrier frequency spacing is set to 78.125 kHz,
wherein a first index group of the index field is used to indicate a first RU corresponding to a first resource unit allocation field of the plurality of resource unit allocation fields and a second index group of the index field is used to indicate a second RU corresponding to a second resource unit allocation field of the plurality of resource unit allocation fields,
wherein each of the first index group and the second index group includes continuous index values, and
wherein the bit length of the index field is 7, the first RU includes a 26-RU including 26 subcarriers, and the second RU is a 52-RU including 52 subcarriers.

2. The method of claim 1, wherein the first index group includes index values of '0000000' to '0100100' and the second index group includes index values of '0100101' to '0110100'.

3. The method of claim 1, wherein the plurality of bands include at least one of 20, 40, 80, and 160-MHz bands.

4. The method of claim 1, wherein each of the plurality of respective resource unit allocation fields further includes an additional field indicating coding types and modulation and coding scheme (MCS) techniques applied to a corresponding uplink PPDU.

5. An access point of a wireless LAN system, comprising:
an RF unit configured to receive a signal by using at least one among a plurality of resource unit (RUs) including a first resource unit (RU) and a second RU through at least any one of a plurality of bands; and
a processor controlling the RF unit, wherein the processor is configured to:
 transmit a downlink physical protocol data unit (PPDU) including a trigger frame allocating a resource for uplink multiple user (MU) transmission to a plurality of receiving stations,
 wherein the trigger frame is used to trigger transmission of a plurality of uplink PPDUs from the plurality of receiving stations,
 wherein the trigger frame includes a plurality of resource unit allocation fields for the plurality of receiving stations,
 wherein each resource unit (RU) allocation field includes an index field indicating a RU allocated for a corresponding receiving station, and
 wherein the trigger frame includes a common information field indicating control information on a cyclic prefix (CP) and long training fields (LTFs) of the plurality of uplink PPDUs, and
 in response to the downlink PPDU, receive the plurality of uplink PPDUs from the plurality of receiving stations through resource resources indicated by the plurality of resource unit allocation fields,
 wherein each uplink PPDU includes a legacy part having a first subcarrier frequency spacing and a high efficient (HE) part having a second subcarrier frequency spacing, the legacy part includes a legacy short training field (L-STF), a legacy long training field (L-LTF), and a legacy signal (L-SIG) field, the HE part includes a HE-STF, a HE-LTF, and a data field, the first subcarrier frequency spacing is set to 312.5 kHz, and the second subcarrier frequency spacing is set to 78.125 kHz,
 wherein a first index group of the index field is used to indicate a first RU corresponding to a first resource unit allocation field of the plurality of resource unit allocation fields and a second index group of the index field is used to indicate a second RU corresponding to a second resource unit allocation field of the plurality of resource unit allocation fields,
 wherein each of the first index group and the second index group includes continuous index values, and
 wherein the bit length of the index field is 7, the first RU includes a 26-RU including 26 subcarriers, and the second RU is a 52-RU including 52 subcarriers.

6. The access point of claim 5, wherein the first index group includes index values of '0000000' to '0100100' and the second index group includes index values of '0100101' to '0110100'.

7. The access point of claim 5, wherein the plurality of bands include at least one of 20, 40, 80, and 160-MHz bands.

8. The access point of claim 5, wherein each of the plurality of respective resource unit allocation fields further includes an additional field indicating coding types and modulation and coding scheme (MCS) techniques applied to a corresponding uplink PPDU.

* * * * *